US008047427B2

(12) United States Patent
Sanders et al.

(10) Patent No.: US 8,047,427 B2
(45) Date of Patent: Nov. 1, 2011

(54) CURRENCY RECYCLER RECONCILEMENT ACTIVITY

(75) Inventors: William Thomas Sanders, Denver, NC (US); Daniel Christopher Bohen, Charlotte, NC (US); Shane Anthony Johnson, Charlotte, NC (US); Amy Baker Folk, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 333 days.

(21) Appl. No.: 12/277,980

(22) Filed: Nov. 25, 2008

(65) Prior Publication Data

US 2010/0127070 A1 May 27, 2010

(51) Int. Cl.
*G06Q 40/00* (2006.01)
*G07D 11/00* (2006.01)
*G07F 19/00* (2006.01)

(52) U.S. Cl. ............................ 235/379; 235/487; 902/7

(58) Field of Classification Search .................. 235/379, 235/375, 487, 381; 705/43, 45; 902/7–15
See application file for complete search history.

(56) References Cited

U.S. PATENT DOCUMENTS

| | | | | |
|---|---|---|---|---|
| 7,635,085 | B2 | 12/2009 | Brown et al. | |
| 2005/0096986 | A1 | 5/2005 | Taylor et al. | |
| 2005/0108164 | A1 | 5/2005 | Salafia et al. | |
| 2006/0065717 | A1 * | 3/2006 | Hurwitz et al. | 235/381 |
| 2007/0050291 | A1 | 3/2007 | Avazian et al. | |
| 2008/0126106 | A1 * | 5/2008 | He et al. | 705/1 |
| 2008/0149706 | A1 | 6/2008 | Brown et al. | |

OTHER PUBLICATIONS

PCT/US2009/065720, International Search Report mail date Jan. 26, 2010.

* cited by examiner

*Primary Examiner* — Edwyn Labaze
(74) *Attorney, Agent, or Firm* — Banner & Witcoff, Ltd.; Michael A. Springs

(57) ABSTRACT

A currency handling system, for example, a currency recycler or depository machine, may be configured to process currency transactions, including receiving one or more currency deposits. The currency recycler may attempt to accept and validate the currency received in the deposits, organizing and storing some validated currency while designating one or more other units of currency as temporarily unreconcilable. The currency recycler may also generate and transmit reconcilement reports summarizing a set of currency transactions, including data corresponding to the validated currency and temporarily unreconcilable currency. Reconcilement reports may be output to users or transmitted to corporate offices for business purposes, or may be transmitted to financial institutions for crediting bank accounts, and currency that could not be validated may be stored securely to allow a business to receive provisional credit.

27 Claims, 10 Drawing Sheets

800a

STORE ABC
RECONCILEMENT REPORT – MAY 12, 2009

| | Validated Recycler Activity | Rejected Notes | Coin Activity | Net Transaction Balance |
|---|---|---|---|---|
| *Register001* | $520 | $54 | $7.44 | **$581.44** |
| *Register002* | ($65) | $86 | $3.62 | **$24.62** |
| *Register003* | $148 | $10 | $18.90 | **$176.90** |
| *Register004* | $272 | $71 | $11.13 | **$354.13** |
| *RegisterCS1* | ($143) | $155 | $4.65 | **$16.65** |
| *RegisterCS2* | $87 | $16 | $30.03 | **$133.03** |
| *Safe Funds Trans* | ($73) | $62 | $11.00 | **$0.00** |
| **TOTALS** | **$746** | **$454** | **$86.77** | **$1,286.77** |

FIG. 8A

800b

STORE ABC
RECONCILEMENT REPORT – MAY 12, 2009

| | Validated Recycler Activity | Rejected Notes | Coin Activity | Net Transaction Balance |
|---|---|---|---|---|
| *Cashier134* | $260 | $72 | $12.18 | $344.18 |
| *Cashier170* | ($124) | $35 | $32.56 | ($56.44) |
| *ManagerA4* | $505 | $69 | $14.90 | $588.90 |
| *Cashier092* | $458 | $195 | $19.56 | $672.56 |
| *ManagerA8* | ($353) | $83 | $7.57 | ($262.43) |
| **TOTALS** | **$746** | **$454** | **$86.77** | **$1,286.77** |

FIG. 8B

CURRENCY RECYCLER RECONCILEMENT ACTIVITY

FIELD OF THE INVENTION

Aspects of the disclosure relate to cash handling in a cash-centric environment. More specifically, aspects of the invention relate to processing, handling, and reporting transactions involving reconcilable and unreconcilable currency at a currency handling device.

BACKGROUND

Cash flow refers to the movement of cash and/or other currencies over a particular time period within a business or enterprise. Business personnel in charge of cash flow management may use various tools to assist in the cash flow process, including cash handling devices, which may include cash recyclers, depository and/or dispensing machines that allow a retail establishment to maintain and re-use an amount of cash on-site. Currency recycler devices, or cash recyclers, may interact with multiple different users acting in different capacities within the business, for example, cashiers temporarily transferring cash to and from points of sale (e.g., cash registers) operating at a store, or employees exchange cash into different denominations, and managers making various withdrawals and deposits in the course of business operations. Cash recyclers may be configured to process currency transactions, accept cash deposits and dispense cash withdrawals, and calculate and manage use of cash flows in real-time.

While cash handling devices, such as cash recyclers or depositories, may allow businesses to manage their cash flows in a more seamless manner, difficulties in currency reconcilement may confuse users during deposits, cause delays in crediting financials accounts, and potentially result in costly accounting errors. For example, a user may want to deposit a type of currency that is not accepted by the user's recycler. For instance, coins, checks, and certain foreign currencies may be acceptable forms of payment to a business, but might not be accepted by the cash recycler used by the business. Additionally, certain accepted currencies might not be successfully validated by the recycler, for instance, worn or damaged bills, counterfeits, and other defective currency. When a currency deposit is not fully accepted or validated, reporting this deposit to a corporate office of the business may result in confusion due to the possibility that the temporarily unreconcilable currency may or may not eventually prove to be valid currency. Transmitting these deposits to a financial institution may also be difficult because the financial institution might not credit the business's account until the entire deposit is validated. Furthermore, temporarily unreconcilable currency deposits pose a challenge with respect to storing and organizing the unaccepted and/or unvalidated currency efficiently and securely while avoiding commingling with validated currencies.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In certain aspects of the invention, currency handling methods, systems, and apparatuses are provided to any cash-centric business or enterprise. In various embodiments, a currency handling apparatus (e.g., cash recycler) may receive and process currency transactions, including, for example, currency withdrawals, exchanges, and deposits during which various currencies may be dispensed, received, and validated by the cash recycler. For currencies received as part of a deposit transaction, the cash recycler may attempt to accept, validate, and store the currency for subsequent transactions and/or transport to a financial institution. During this process, one or more units of currency may fail to be accepted or validated by the cash recycler, and this currency may be identified as temporarily unreconcilable in a subsequent reconcilement report generated to summarize the currency transactions on the recycler. For example, coin currency in deposits may be temporarily unreconcilable for cash recyclers unequipped to accept, validate, or count coins. Similarly, certain bills (e.g., damaged, worn, counterfeit), checks, and other notes may be unreconcilable at certain recyclers. Thus, a reconcilement report may include, for instance, a balance of temporarily unreconcilable units of currency, a balance of validated currency, and a net transaction balance for a set of transactions.

According to other aspects, a reconcilement report may be transmitted to a financial institution managing one or more accounts for the retail establishment associated with the cash recycler. Reconcilement reports may be generated and transmitted based on user interaction or may be periodically scheduled (e.g., daily, weekly) from the cash recycler and/or a corporate office of the retail establishment. The financial institution may receive and process the reconcilement report, identify one or more accounts associated with the establishment, and debit/credit the accounts based on an amount of validated currency transactions indicated by the report. According to additional aspects, the financial institution may also provide provisional credit to one or more accounts based on the amount of unvalidated currency deposits associated with the transactions in the reconcilement report.

BRIEF DESCRIPTION OF THE DRAWINGS

The present disclosure is illustrated by way of example and not limited in the accompanying figures in which like reference numerals indicate similar elements.

FIGS. 8A-8B illustrate two sample reconcilement reports in accordance with aspects of the present invention.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), cash dispensing machines, cash depository machines, currency recyclers and the like. Currency recyclers generally refer to cash handling devices that are configured to dispense the same currency that was earlier deposited. For example, if a user deposits a five-dollar bill into a cash recycler machine, the same five-dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
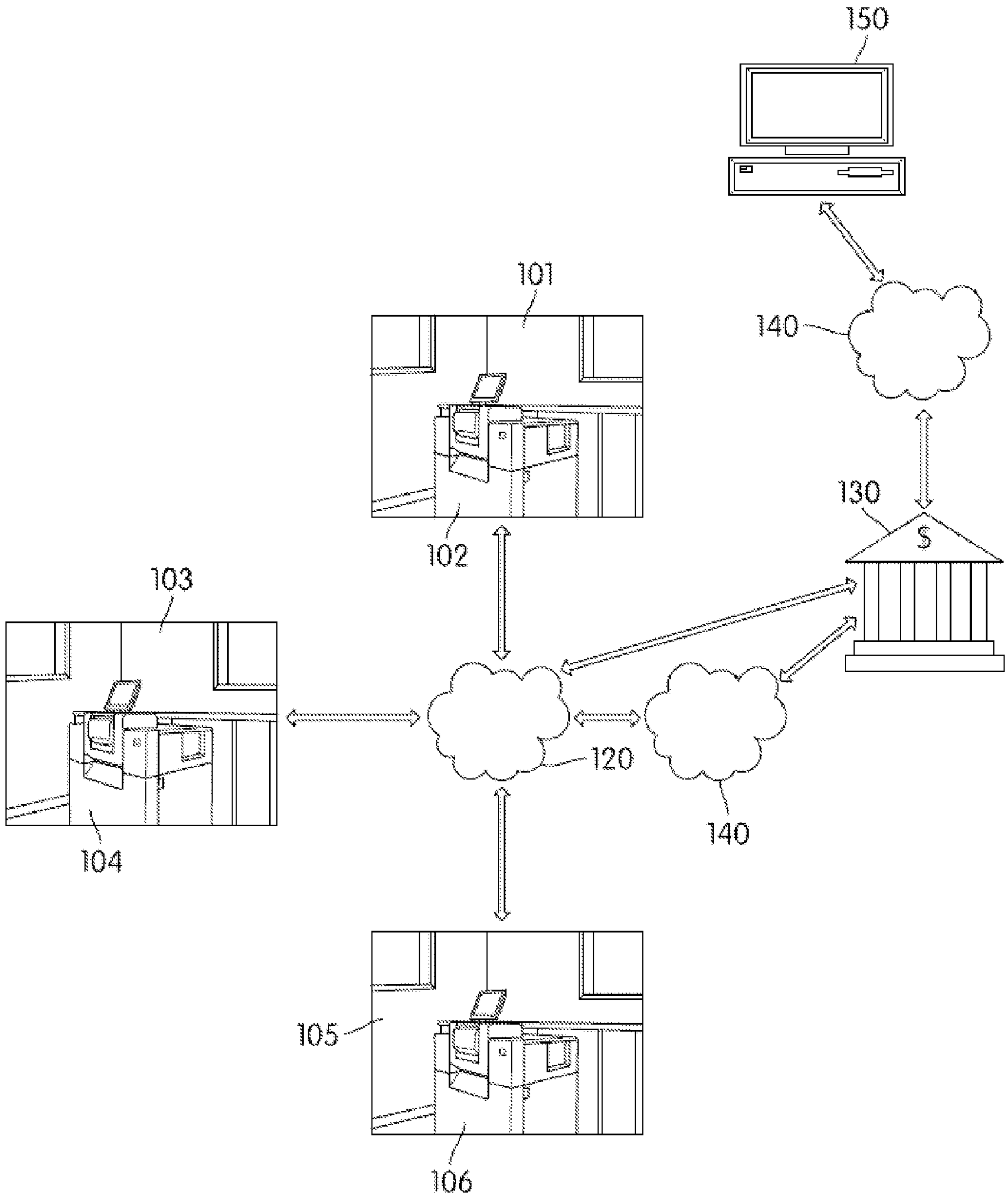
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
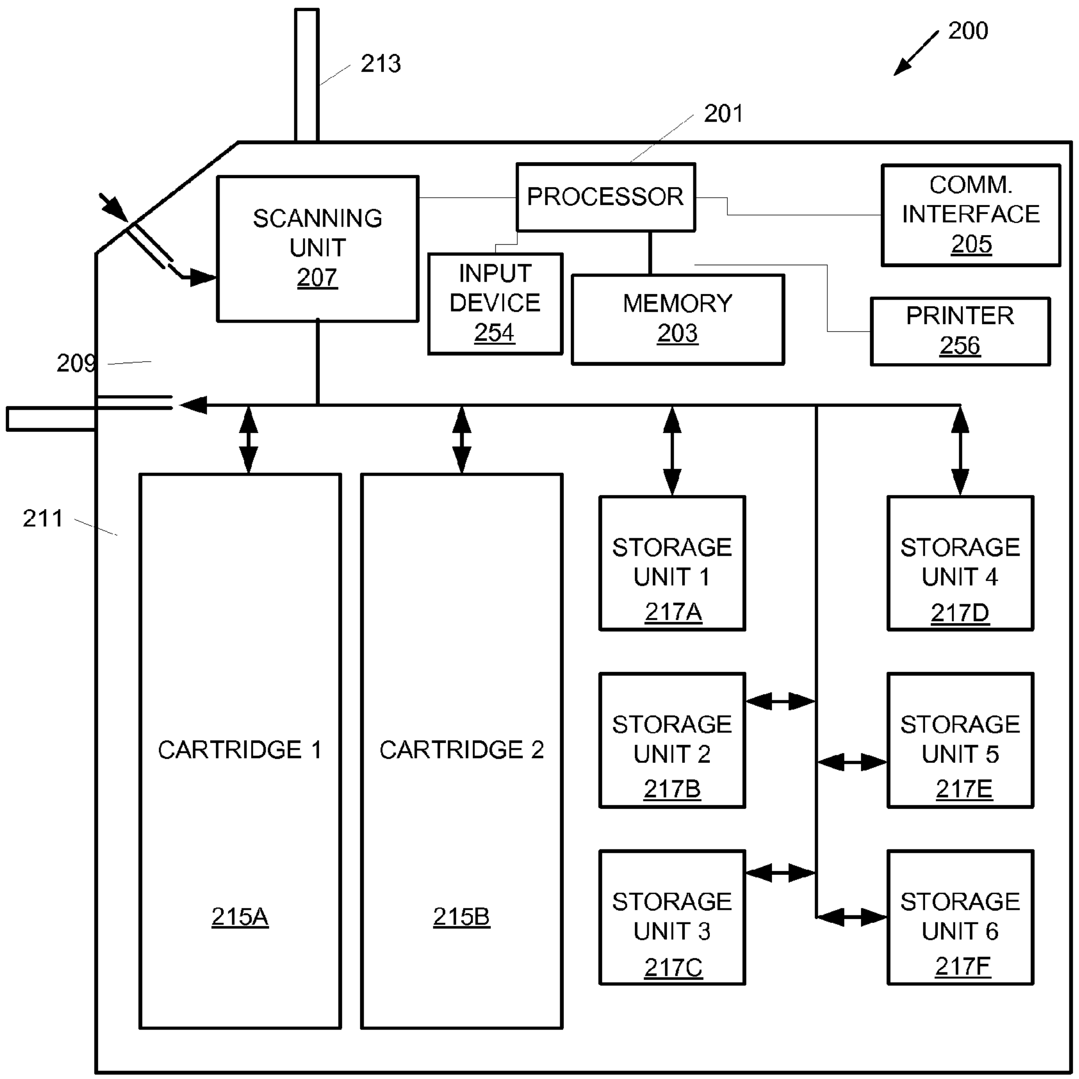
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and storage units 217 (e.g., stackers or Rolled Storage Modules (RSMs)). Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or more printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
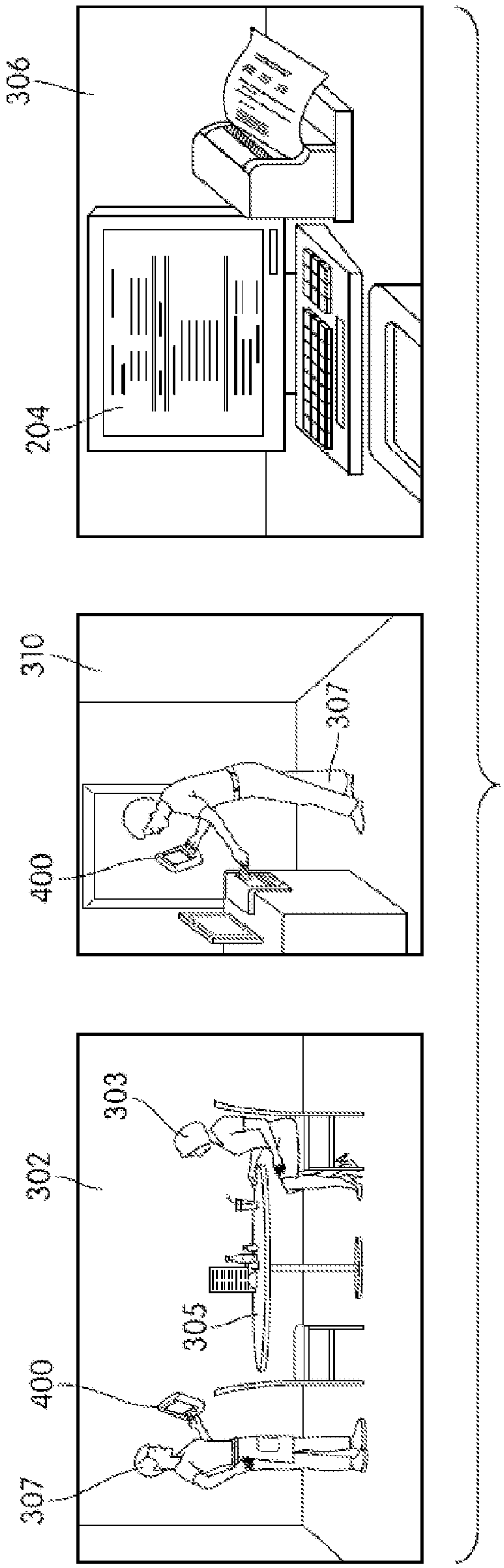
FIG. 3 illustrates various features of a currency recycler that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
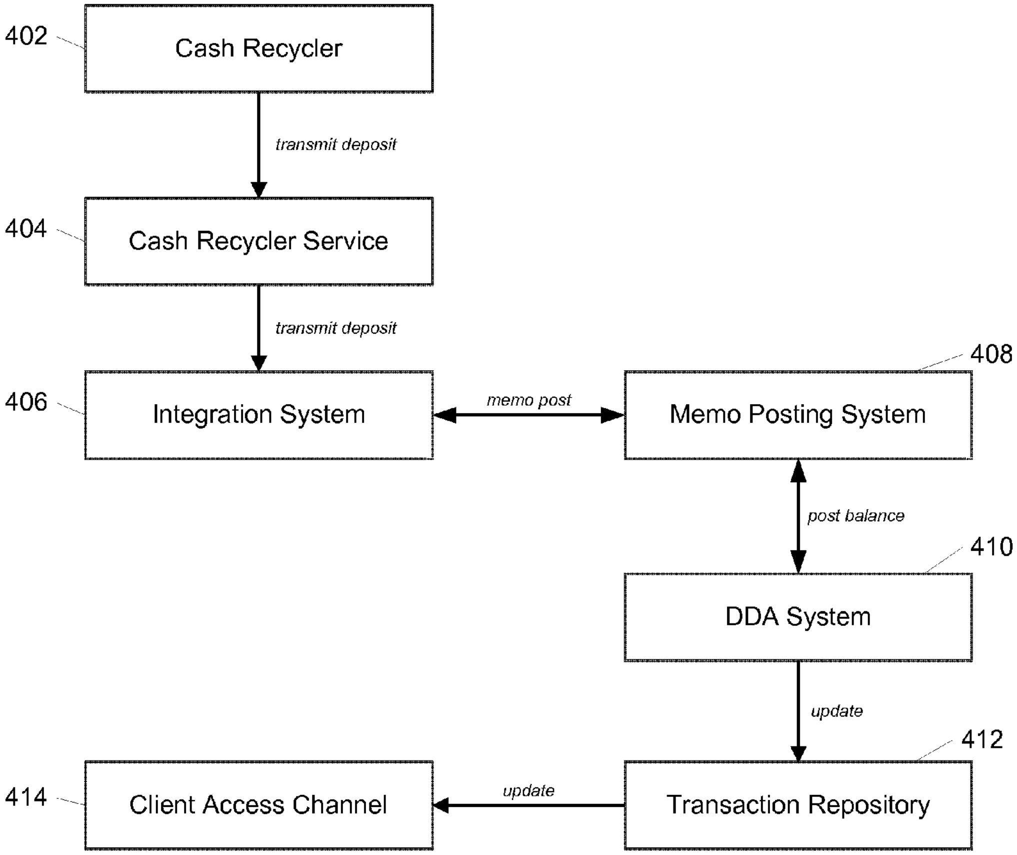
FIG. 4 illustrates a system configuration that may be used in accordance with aspects of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIGS. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers many advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, now U.S. Pat. No. 7,635,085, issued Dec. 22, 2009, the contents of which is incorporated herein by reference in its entirety.

Figure 5:
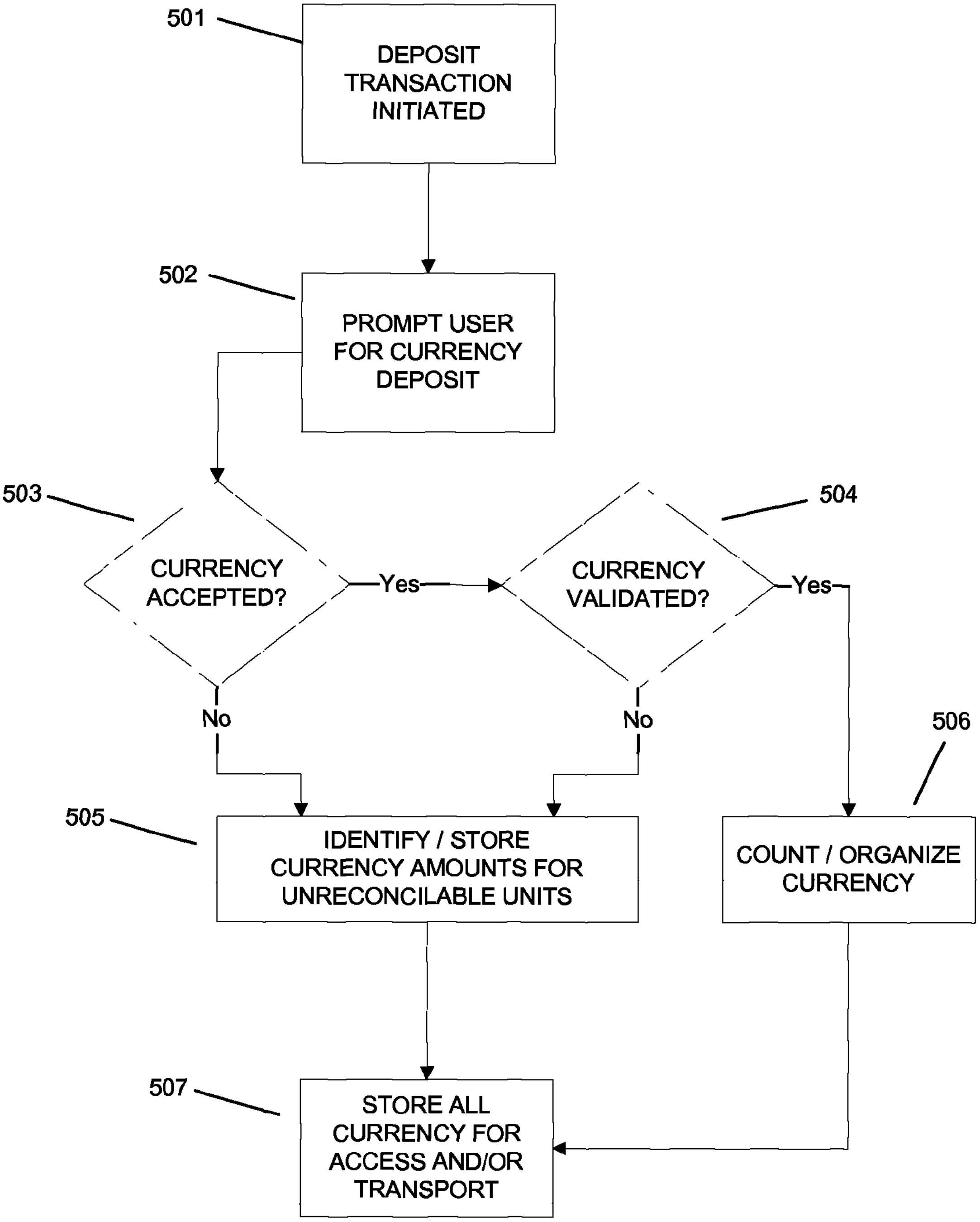
FIG. 5 illustrates a method of processing deposit transactions at a currency handling device in accordance with aspects of the present invention.

FIG. 5 is an illustrative flow diagram outlining the steps for processing user initiated deposit transactions at a currency handling device (e.g., cash recycler 200) and storing the currency received from the deposit transactions. As described below, the cash recycler 200 in this example may be equipped and configured to support different types of currency transactions (e.g., deposits, withdrawals, and exchanges) associated with different users of the recycler 200 and/or different points of sales (e.g., store registers). The recycler 200 may also support other currency-related functions (e.g., report generation, user management, and administrative functions). The example flow diagram of FIG. 5 relates to a currency deposit transaction at the cash recycler 200. As discussed above, the cash recycler 200 may communicate with one or more financial institutions via a remote service (e.g., cash recycler service 404) to allow the deposit accounts of users or stores to be credited even before the physical currency is received by the financial institution. Thus, it may be desirable for a business to have an accurate accounting of the currency amounts and other deposit transaction information (e.g., associated users, points of sale, etc.), and to properly organize and store the physical currency until it is transported to the financial institution. The illustrative steps 501-507 relate to this process.

Figure 6A:
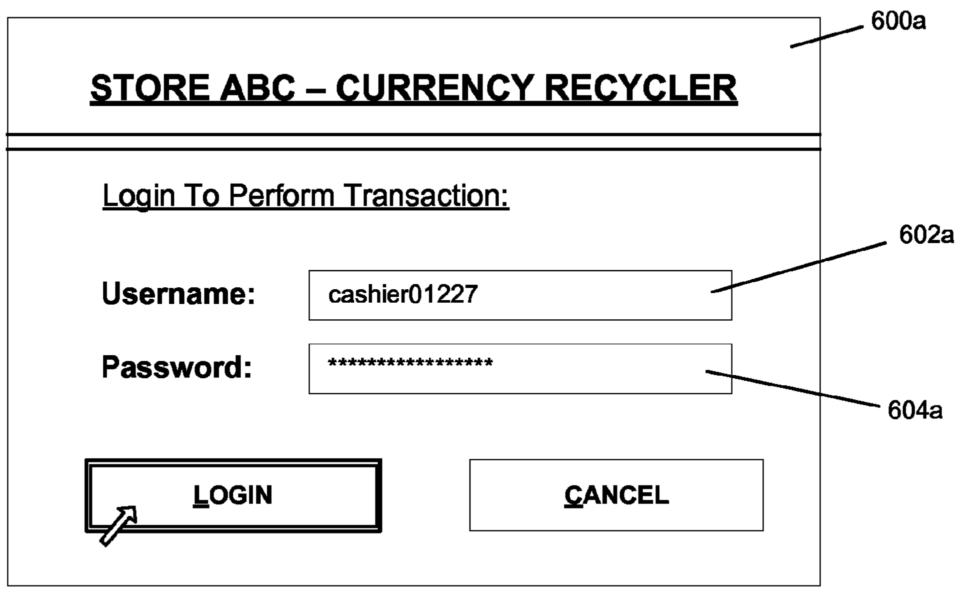
FIGS. 6A-6E illustrate a plurality of user interfaces relating to processing one or more example deposit transactions in accordance with aspects of the present invention.
Figure 6B:
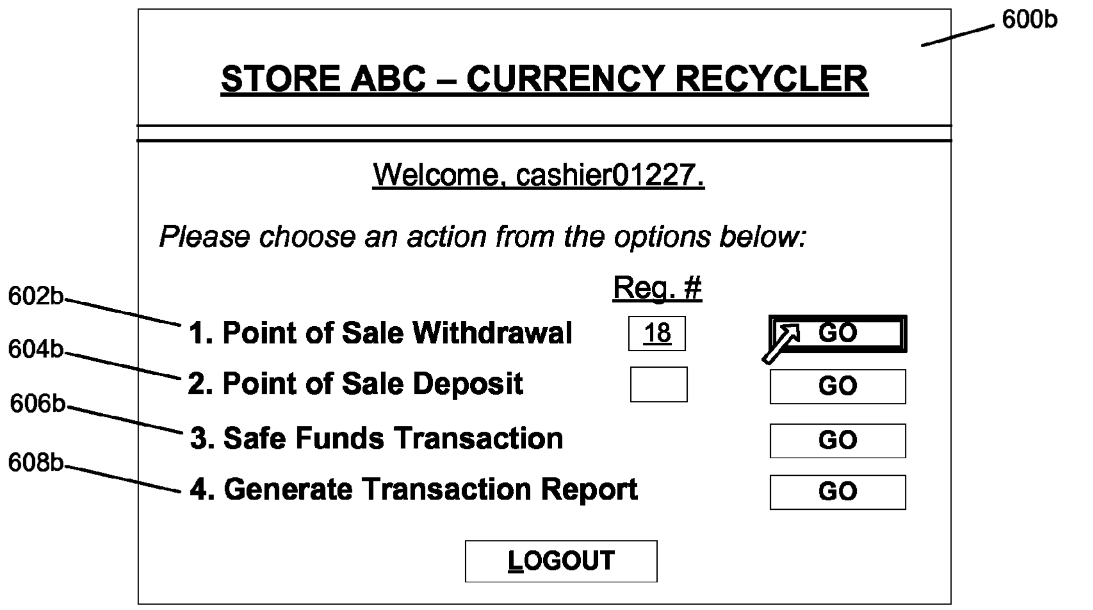

In step 501, a deposit transaction is initiated at the cash recycler 200. According to certain aspects, recycler deposits may be associated with a certain user and/or point of sale location (e.g., register) within a store or other retail establishment. Thus, before receiving and handling the physical currency and processing the transaction, the recycler 200 may provide a user interface to authenticate the user and identify the specific type of transaction that the user is attempting to perform. Accordingly, in step 501, the currency recycler 200 may display an authentication user interface to identify the user, the associated point of sale location, and/or type of transaction that the user wishes to perform. For example, referring to FIGS. 6A-6B, an example user interface 600*a*-600*b* is shown that a recycler 200 at a retail location (e.g., Store ABC) may use to authenticate a user and allow the user to select a desired transaction type and location. In FIG. 6A, the user interface screen 600*a* includes text boxes to allow the user to enter login information 602*a* and password information 604*a*. After this information is submitted, the recycler 200 may access a user authentication database, for example, within the memory 203 of the recycler 200, to verify the user credentials, authenticate the user as a valid user of the recycler 200, and then to retrieve the set of functions that the user is authorized to perform. For example, in FIG. 6B, the user interface screen 600*b* indicates that the user (e.g., cashier01227) is authorized to access the cash recycler 200 to perform at least the following functions: a point of sale withdrawal for at least one of the store registers 602*b*; a point of sale deposit for at least one of the store registers 604*b*; a safe funds transaction 606*b* (i.e., a transaction not associated with a point of sale); and generation of a transaction report (e.g., user or register transaction reports) 608*b*. Currency recyclers, user authentication, and delegation of transactions are further described in U.S. application Ser. No. 12/323,001, entitled "Proxy Transactions and Delegation of Transaction Capabilities and Roles," filed on Nov. 25, 2008, the contents of which is incorporated herein by reference in its entirety. The types of access permitted and types of functions available (e.g., currency transactions, transaction reports) may also depend on a specific transaction location (e.g., register). For example, a store employee might be authorized to perform point of sale (POS) withdrawals, deposits, and to generate reports, but only for certain registers in the store (e.g., a cashier's preassigned register, the group of registers in the cashier's sales department, etc.).

Returning to FIG. 5, in this example the user has initiated a currency deposit transaction. For instance, the cashier01227 user may have entered his/her user credentials as shown in user interface 600*a*, and then selected the point of sale deposit option 602*b* for register 18 as shown in user interface 600*b*.

In step 502, after selecting the transaction type and register, the user interface may prompt the user to insert the currency for the deposit into the recycler 200, for example, via input slot 209. In certain examples, the input slot 209 may comprise one or more openings to accept bills, coins, checks, etc., that may be fed individually into the recycler 200 by the user. In other examples, the input slot 209 may comprise a larger bin to accept a stack of multiple bills at once and/or a coin slot or coin basket to accept deposits of loose coins. In other examples, the input slot 209 may comprise a cash drawer (or till) opening that allows users to physically insert an entire register drawer into the recycler 200 to deposit without ever touching the individual bills, coins, or other types of currencies in the register. In these examples, the user interface presented by the recycler 200 in step 502 may be updated to provide the user with interactive instructions for inputting different types and amounts of currency into the recycler (e.g., coins, bills, foreign currencies, checks, etc.).

In step 503, a determination is made whether the recycler 200 will accept the currency input as part of the deposit transaction. However, as discussed below, even if one or more units of currency are not accepted by the recycler 200, the unaccepted currency may still be included as part of the deposit. Additionally, although steps 502-507 represent logical steps of an overall currency deposit process, it should be understood that these steps may be performed in a loop for multiple different units of currency during the deposit. For example, if the currency deposit involves feeding individual units of currency (e.g., bills) into the input slot 209 of the recycler 200, then each bill may be accepted or rejected (step 503), validated (step 504), counted (step 506), and stored (507), before the next bill is fed into the input slot 209, and so on. In other examples, some (or all) of the currency for the deposit may be input (steps 502-503) before any of this currency is validated (step 504), and so on. Furthermore, in certain examples, the recycler 200 may be equipped such that multiple of the logical steps 503-507 are performed by a single physical component (e.g., a scanning unit 207 that receives, validates, counts, and sorts currency).

If a unit of currency is not accepted by the cash recycler 200 (503:No), it may initially remain outside the recycler 200 with the user performing the currency deposit. For example, a damaged or misshapen unit of currency might not physically fit into the input slot 209 of the recycler. As another example, a retail store may have accepted as payment (intentionally or accidentally) foreign currency that is larger or smaller than standard U.S. currency sizes. In this case, if the store has a recycler 200 that is only equipped to handle U.S. currencies, than the foreign currency might not be accepted by the recycler 200. Furthermore, certain valid U.S. currencies might not be accepted by the recycler 200. For instance, certain recyclers 200 may be designed to only accept bills, and not coin currency. Other recyclers 200 may accept some coin currency (e.g., pennies, nickels, dimes, quarters), but not others (e.g., half-dollars, dollars, other special mint U.S. coins). In these and other examples, when currency is not accepted into the recycler 200 (503:No), the currency will remain with user and handled as described below in reference to step 505.

If the currency is accepted by the recycler 200 (503:Yes), then the currency may be internally validated in step 504. As noted above, a scanning unit 207 (or other combination of currency validation devices) within the recycler 200 may be used to detect counterfeit currency, defective currency, unaccepted foreign currency, or any other currency that is not recognized as valid by the recycler 200. If the currency is successfully validated (504:Yes), then it may be counted and organized in step 506, and stored at a designated location within the recycler 200 in step 507. Additionally, step 506 may include maintaining a sum total of all of the currency that has been successfully validated and counted as part of the current deposit. For example, after the scanning unit 207 validates and identifies the type and denomination of a unit of currency, the deposit count may be updated in step 506. Stackers 217 and cartridges 215 may then be used to organize and store the currency based on type and denomination in step 507. For instance, a stacker 217B may be used to store all $1 bills, while stacker 217C is used to store $5 bills, and so on. Although this example refers to sorting and counting bills, other types of currency validated by the recycler 200 in step 504 (e.g., coins, foreign currency, checks) may also be organized, counted, and stored using similar steps. For instance, a recycler 200 at a retail establishment accepting multiple types of foreign currency may have a scanning unit 207, cartridges 215, and storage units 217 that are configured to identify, count, and store the different foreign currencies into different designated locations within the recycler.

However, if the currency is not successfully validated (504:No), then it may be returned to the user as described above (e.g., via the input slot 209 or the withdrawal slot 211), or the currency may be retained by the recycler 200 in a designated storage area to await additional user instructions and/or processing. For example, referring now to FIG. 6C, an illustrative user interface 600*c* is shown continuing the sample user interface described above in FIGS. 6A-6B. As indicated in the transaction status region 602*c*, the cashier01227 user has initiated a deposit transaction from Register 18, and has finished inputting the currency for the deposit into the recycler 200. The user interface 600*c* also indicates that the recycler 200 has completed the bill scanning and validation (corresponding to steps 504 and 506). In this example, the user interface 600*c* summarizes the bill scanning and validation process by displaying three values: the number of bills successfully validated 604*c*, the total cash value of the bills validated 606*c*, and the number of bills that failed the validation process 608*c*. The bills that were successfully validated and counted (604*c*, 606*c*) may be organized and stored within the recycler 200 as described above in reference to steps 506-507. However, for the bills that could not be validated successfully (608*c*), additional processing steps may be required to handle (e.g., validate, count, and store) these bills so that they may be included, if desired, in the deposit transaction. In this example, 13 bills were not validated successfully (608*c*).

Figure 6C:
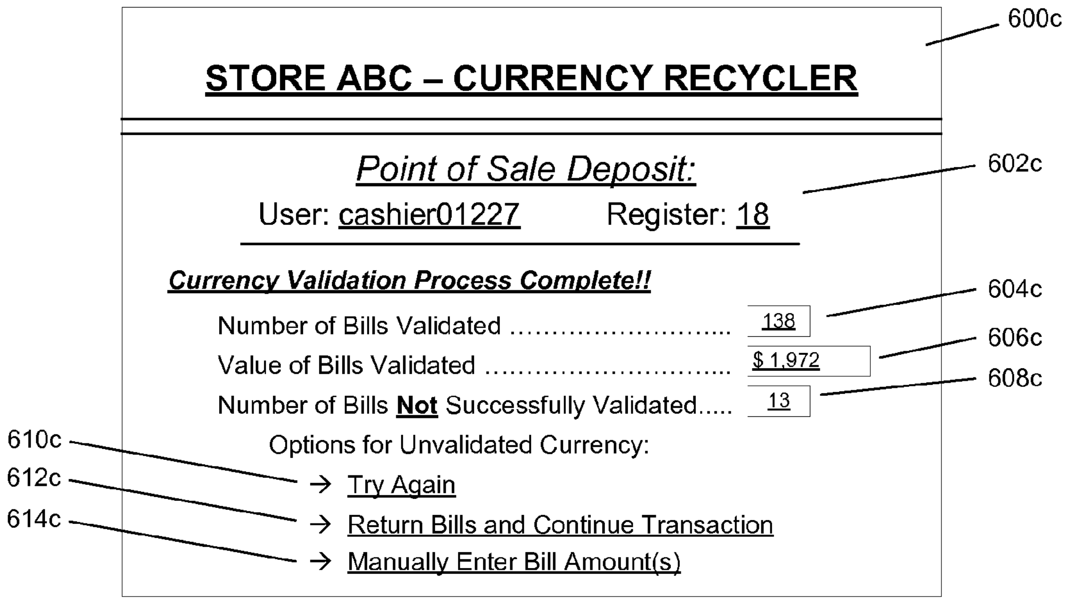

As discussed above, in certain examples, bills that cannot be validated (608*c*) may simply be returned to the user via input slot 209 or withdrawal slot 211. However, in other examples, these bills need not be returned immediately. For instance, as shown in FIG. 6C, the recycler 200 may temporarily retain these bills and may present the user with one or more options for handling failed bill validations. In this example, the first user option 610*c* is to request that the recycler 200 make another attempt to validate the unvalidated bills. Option 610*c* may simply involve another validation attempt via the scanning unit 217, but could also include other steps to improve the likelihood of success on the revalidation attempt. For instance, bills may be flattened, brushed, or cleaned by an internal component of the recycler 200 before the revalidation attempt, or may be temporarily output to allow the user to remove any foreign objects attached to the bills before re-inserting the bills for the revalidation attempt.

The second option 612*c* instructs the recycler 200 to return the unvalidated bills to the user and to continue the deposit transaction while excluding these bills from the deposit. For example, a policy of a store or financial institution associated with the recycler 200 may dictate that deposits should consist of entirely validated currency, and that other unvalidated currencies should be handled in separate recycler transactions, or handled completely outside the recycler 200.

The third option 614*c* of FIG. 6C indicates that the user will manually enter the values (e.g., denominations) of the remaining bills that were not validated by the recycler 200 in step 504. If option 614*c* is selected, the recycler 200 may return the unvalidated bills to the user via input slot 209 or withdrawal slot 211, and then provide an updated user interface to allow the user to enter the denomination for each bill and to reinsert the bills one at a time into the recycler 200. In this example, the recycler 200 may then store the denominations and track the associated bills so that they may be properly handled and stored in the remaining stages of the transaction. In other examples, the user may manually add the values of all unvalidated bills and enter this value into the user interface as a single amount. Although potentially faster, this example may be prone to additional user errors and may create difficulties for sorting and storing the bills in the recycler 200.

Figure 6D:
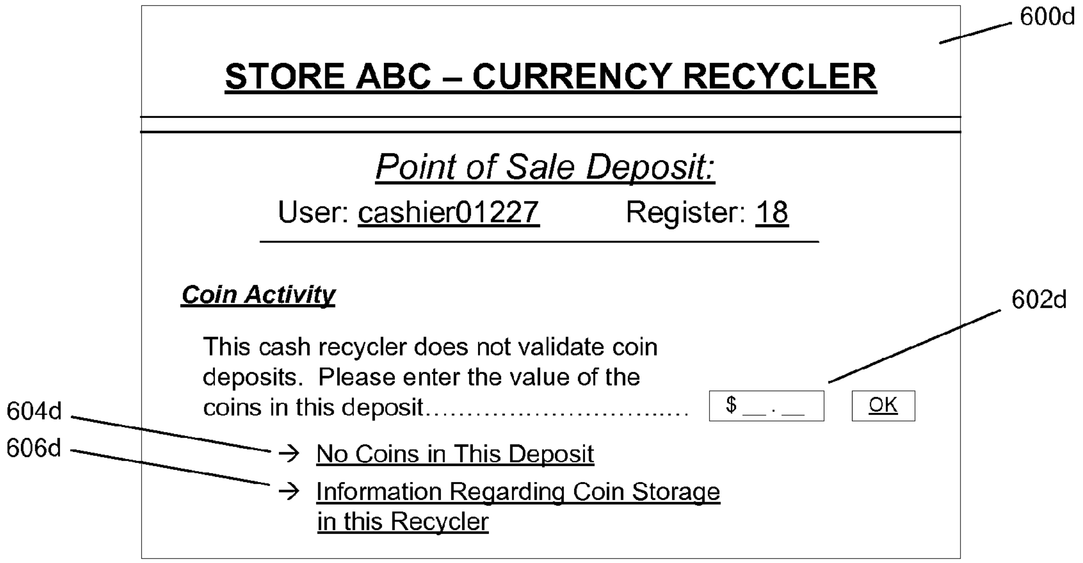

Although the example of FIG. 6C relates to bills of currency, other currency types also might not be accepted (503: No) or validated (504:No) by the recycler 200 in certain situations. Referring now to FIG. 6D, an illustrative user interface 600*d* is shown informing the user that the recycler 200 does not validate coin deposits. That is, in this example, the recycler 200 may be limited to only handling notes (e.g., bills, checks), and might not be equipped (or configured/programmed) to receive or validate coin input. Thus, as shown in FIG. 6D, the recycler 200 may handle all coins as unreconcilable currency, similar to the unvalidated bills in FIG. 6C. Accordingly, the user interface 600*d* includes a text area 602*d* to allow the user enter the value of the coins in the deposit. If the user has no coins to deposit (or prefers coins to deposited separately, for example, in a separate recycler transaction or directly to a financial institution), then the user may select the option 604*d*, or in other examples may simply input "$0.00" into the coin value text area 602*d*. As described below, coins and/or other unaccepted or unvalidated currencies may still be stored in the recycler 200 and/or included in the deposit transaction. Thus, user interface 600*d* also includes an option 606*d* to provide the user with information regarding coin storage, which may be inside or outside the recycler 200. Providing additional information at this stage in the deposit transaction may allow the user to better determine which coins he/she wants to include in this deposit.

As described below, manually entered bills, notes, and other currencies may be stored securely either within the recycler 200 or externally, and provisional credit may be provided based on these secure unvalidated funds. For instance, the recycler 200 in FIG. 2 may have a separate drop slot into a secure storage box (not shown) that will hold unvalidated currency until it is transported to a bank 130 for validation. Retail establishments may also designate other locations outside of the recycler 200 (e.g., a store safe with a designated drop slot and separate secure storage box) to hold unvalidated currency until it is transported to the bank 130. As discussed below, in certain examples, a bank 130 may provide provisional credit for securely held unvalidated currency that were incorporated in a cash recycler deposit transaction. In other examples, a client (e.g., store) may prefer to hold those items out separately and may exclude them from the transaction (e.g., option 612*c*) and decide later when and how to deposit these unvalidated funds. In these example, a bank 130 might not offer provisional credit for the excluded currency and/or for currency that is not securely stored in a designated location inside or outside the recycler 200 prior to transport to the bank 130.

The example shown in FIG. 6D relates to a recycler 200 that is not equipped to validate coins, however, in other examples, the recycler 200 may be configured to receive/validate coin deposits as well as bills and other types of currency. In these examples, the user interface 600*d* may be replaced by another user interface similar to one shown in FIG. 6C, in which the number of counted coins, total coin value, and information regarding any unvalidated coins may be presented to the user along with a similar set of options for handling the unvalidated coins. Additionally, in other arrangements, various recyclers may have other different limitations on the types of currencies that they are capable of receiving and/or validating. In these examples, if a cash recycler 200 is not equipped or configured to accept a particular type of currency, then the recycler 200 may display a user interface similar to user interface 600*d* of FIG. 6D. Similarly, if a recycler can accept and validate a particular type of currency, but not every unit of currency is successfully validated, then the recycler 200 may display a user interface similar to user interface 600*c* of FIG. 6C. Thus, although FIGS. 6A-6E describe a simple example relating to bills and coins, in other examples, the limitations of other recyclers 200 in accepting and validating other types currencies (e.g., foreign bills, foreign bills, checks) may be handled in a similar manner.

In step 505, the value of the currency included in the deposit that was not accepted in step 503, or successfully validated in step 504, may be identified and stored at the recycler 200. Thus, in step 505, the values received in the above examples corresponding to unvalidated bills (FIG. 6C) and coin activity (FIG. 6D) may be stored and associated with (e.g., added to) the validated currency count created in step 506. In other examples, amounts for other types of currency that could not be accepted or validated by the recycler 200 (e.g., foreign currency, checks, etc.) may be identified via a similar user interface or other technique.

In step 507, the currency associated with the deposit is stored so that it may be accessible, e.g., for transporting to the financial institution 130, or for use in subsequent transactions at the recycler 200. As described above, currency that was successfully validated (504:Yes) and counted (506) may then be organized and stored into designated cartridges 215 and stackers 217. However, for unaccepted or unvalidated currency, one or more alternative storage techniques may be used. For example, for bills that were not validated by the scanning unit 207 but were manually identified by the user (see, e.g., option 614*c* of FIG. 6C), a policy decision may be made regarding whether to store these bills together or separately from the validated bills. That is, since the bill denominations have been entered by the user in this example, it may be possible to store the bills in the same designated cartridges 215 and stackers 217 used to store validated bills of the same denominations. This solution may be preferable in situations in which trusted and trained personnel (e.g., bank employees, store managers) have performed the manual validation of the currency. However, in other examples, due to concerns about user training, fraud, counterfeit bills, or other currency defects, it may be preferable to store the unvalidated bills in a separate physical container within the recycler 200. For instance, one or more designated bill stackers 217 (e.g., without bill validation units) may be used to store the unvalidated bills separately until these bills can be received and validated by the financial institution 130.

For currency that is not accepted by the recycler 200, additional storage options may be possible. For instance, as in the example above, the recycler 200 might not be equipped to accept coin deposits. In this example, after the user enters the coin amount into the user interface 600*d*, the recycler 200 may provide an alternative storage location (e.g., designated secure storage bins for rolled and/or loose coins), so that these coins may be physically housed within the recycler 200 to facilitate transport to the financial institution 130. This solution may be preferable in certain instances, to prevent the inconvenience of requiring retail establishments to separately store their own previously deposited coins, and to avoid the risk that those coins would be commingled with other coins in the establishment and accidentally deposited multiple times. In other instances, retail establishments and/or financial institutions may prefer that deposited coins be stored outside the recycler 200, (e.g., in a store safe).

Other currency that was not accepted and/or validated by the recycler 200 may be stored using a similar combination of techniques. For example, a recycler 200 that accepts U.S. bills and coins may be configured to validate, count, and store the bills and coins in designated internal storage locations, but might not be configured to accept and/or validate foreign currencies of any type. In this example, the recycler 200 may provide an internal storage location (e.g., a stacker without a validation unit, storage bin) to hold the foreign currency until it is transported to the bank 130, or alternatively may instruct the user to store the foreign currency securely outside of the recycler 200.

Figure 6E:
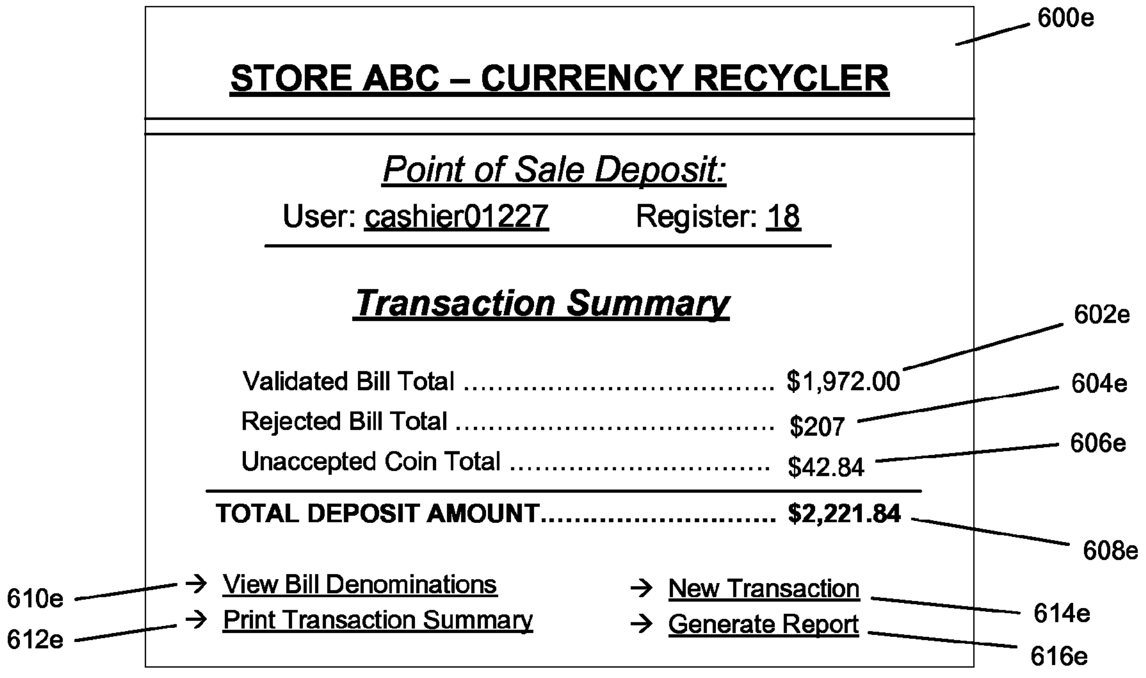

Referring now to FIG. 6E, an illustrative user interface 600*e* is shown that may be displayed by the recycler 200 at the conclusion of the deposit transaction in this example. In user interface 600*e*, a transaction summary is displayed including the amount of validated bills in the deposit 602*e*, the amount of rejected (e.g., unvalidated) bills 604*e*, the amount of deposited (unaccepted) coins 606*e*, and the sum of these three amounts which represents the total amount deposited in the transaction 608*e*. In other examples, the deposit summary user interface 600*e* may be updated based on the types of currencies accepted at the recycler 200 and the types of currencies included in the deposit. Thus, the deposit summary user interface 600*e* may also include validated and unvalidated coin totals for recyclers 200 that are configured to accept coins, deposits amounts from checks and other notes, and foreign currency amounts, etc. In this example, an additional set of options 610*e*-616*e* is also available to the user at the completion of the deposit transaction. Option 610*e* may allow the user to view a more detailed deposit summary including the breakdown of denominations in each category of the deposited currency. Option 612*e* may allow the user to print the deposit summary via printer 256. Option 614*e* may allow the user to initiate a new transaction, and option 616*e* may allow the user to generate a transaction report (e.g., based on users, registers, etc.).

Figure 7:
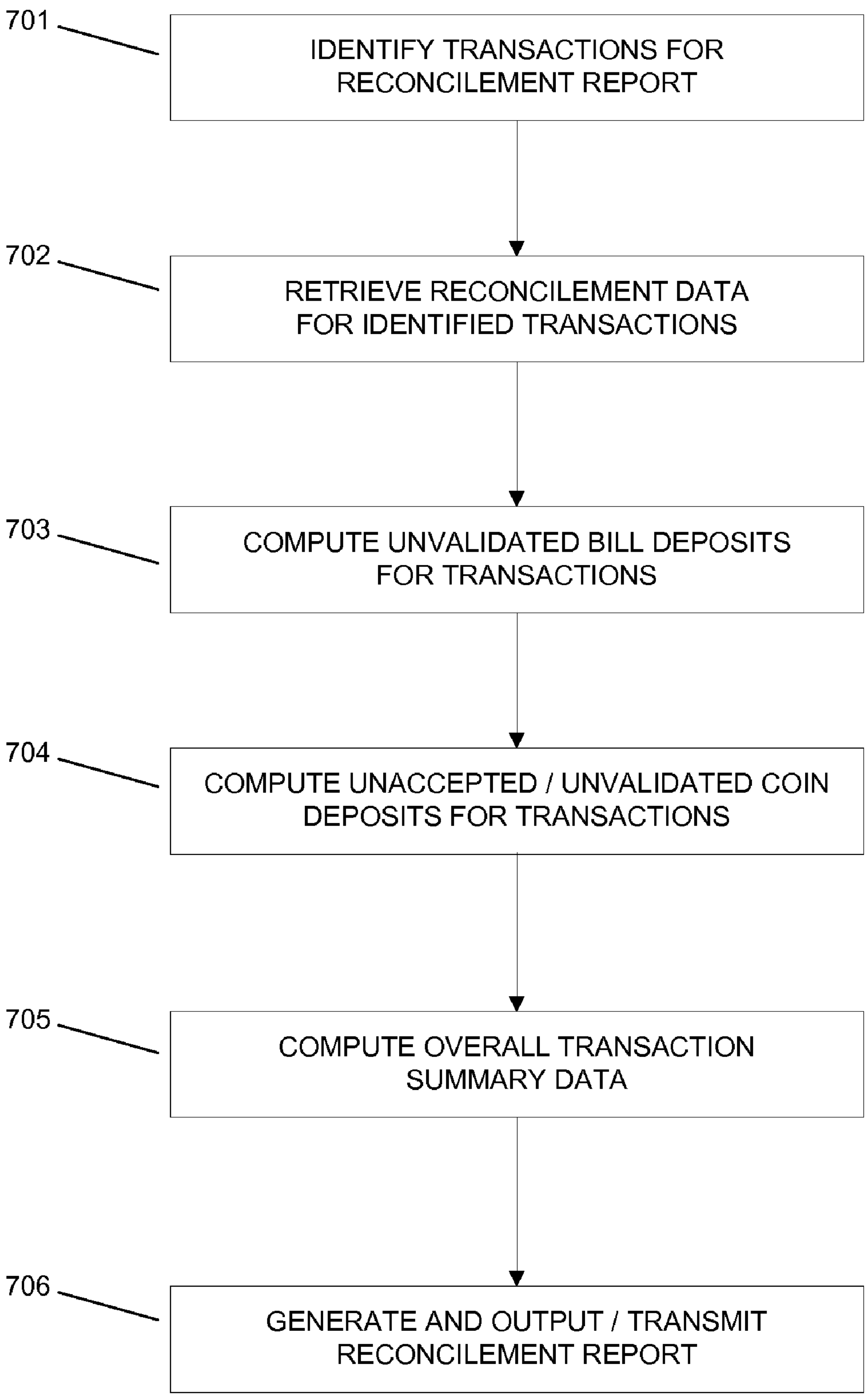
FIG. 7 illustrates a method of generating a reconcilement report in accordance with aspects of the present invention.

FIG. 7 is an illustrative flow diagram outlining steps for generating a reconcilement report for one or more transactions at a recycler 200. As discussed above, a reconcilement report includes data identifying the validated and unvalidated currency associated with transactions at a currency handling device (e.g., cash recycler 200). For example, the transaction summary shown in FIG. 6E, including validated currency data 602*e* and unvalidated currency data 604*e*-606*e* for the sample deposit transaction, may be considered a reconcilement report for a single transaction. Unlike FIG. 6E, most other reconcilement reports may summarize validated and unvalidated currency for multiple transactions, including, withdrawals, deposits, and exchanges, performed at one or more recyclers 200 over a predetermined period of time. As described below, the reconcilement reports may also group and summarize transactions together by time/date, user, point of sale (e.g., register), store, recycler, and other variables to provide an accurate and readable summary of reconcilement data.

In certain examples, reconcilement reports may be initiated by users at a store (or other retail establishment) having a recycler 200 based on transaction data stored within the recycler 200. For instance, the recycler 200 may provide a store manager with a user interface to generate reconcilement reports and transmit the reports via a computer network 120 to the store's corporate office, banking services provider 130, or other entity. Alternatively, reconcilement reports may be generated remotely by a variety of different users. For example, an authenticated user may log in to the recycler 200 remotely via LAN 120 or WAN 140 computer networks (e.g., Internet web page) to initiate and retrieve a reconcilement report. In other examples transaction data for a recycler 200 may be stored remotely, for instance, at a central corporate data server, in which case generating a reconcilement report need not require any direct interaction with the recycler 200. Reconcilement reports may also be generated automatically according a report generation schedule (e.g., daily, weekly, monthly, yearly, etc.) for different stores, recyclers, and other variables described below.

In step 701, the set of transactions to be summarized in the reconcilement report is identified. For example, as described above, a remote or local user may log in to a recycler 200 (or remote database comprising recycler transaction data) and interact with a user interface to define the parameters of the reconcilement report and to initiate the report generation. The parameters of the reconcilement report may include one or more time periods, recyclers, store locations, users, points of sale, transaction types, amounts, and other variables corresponding to the transaction data stored in the database. As a simple example, a store manager or auditor at a corporate office may request a daily reconcilement report for all currency transactions performed via a store recycler 200. FIGS. 8A and 8B, described below, are illustrative examples of daily reconcilement reports that have been sorted by point of sale (FIG. 8A), and by user (FIG. 8B). In other examples, a user may generate a reconcilement report corresponding to a longer period of time (e.g., week, month, year), or corresponding to one or more previous time ranges (e.g., transactions over the last quarter, comparing the current month's transactions to the same month last year, etc.). Additionally, the reconcilement report generated by the user may correspond to multiple recyclers and/or multiple stores. For instance, a corporate manager may generate a reconcilement report for all store branches in a specified region of the country, sorted by branch location, based on a corporation-wide recycler transaction database stored at a central data server. Additionally, a user may generate a reconcilement report including only certain types of transactions (e.g., deposits only, excluding safe funds transactions, etc.) and/or may sort reports by transaction type. In still other examples, a user generating a report may specify a group of recycler users (e.g., all cashiers at Store ABC, all managers at all branches), or may specify a group of registers/points of sales to include as a criteria when identifying the transactions to be used in reconcilement reports and/or when sorting the reports. Based on the many different criteria discussed above (which may be used alone or in various combinations) to identify the recycler transactions for the reconcilement report, it should be understood that many different possible user interfaces and data retrieval techniques may be used, all of which are readily understood to one of skill in the art.

In step 702, after the set of transactions for the reconcilement report has been identified, the corresponding reconcilement data (e.g., validated and unvalidated currency) for the transactions may be retrieved (e.g., from a recycler database or corporate transaction server). For example as mentioned above, the reconcilement report may contain information regarding unaccepted and unvalidated currencies, similar to the individual transaction data 604_e_-606_e_ shown in the deposit summary of FIG. 6E. Thus, in step 703 the unvalidated bill deposits are compiled for the different data components of the reconcilement report (e.g., subsets of transactions corresponding to different users, different registers, etc.), and in step 704 the unaccepted and/or unvalidated coin deposits are compiled for the different data components. In other examples, other types of reconcilement data may be retrieved instead of or in addition to the coin activity and unvalidated bills. For example, validated and unvalidated foreign currencies, checks, and other notes may also be included in the reconcilement data retrieved in these steps and in the reconcilement report.

In step 705, the transaction summary data may be compiled for the data components (e.g., users, registers, etc.) of the reconcilement report, including the unaccepted/unvalidated deposit information compiled in steps 703 and 704, along with all validated transaction data (e.g., currency withdrawals, deposits, and exchanges).

In step 706, the reconcilement report may be generated and output to the user and/or transmitted to one or more additional parties requesting the report (e.g., a store corporate office, financial institution, etc.) For example, the report may be directly displayed on a display screen 213 of the recycler 200, printed at the printer 256, or electronically transmitted over one or more computer networks 120 and 140 to a remote location (e.g., bank server 150, store corporate office). As discussed above, reconcilement reports may be generated remotely via a web page or other computer application with network access to the recycler 200 or other recycler transaction database.

FIGS. 8A and 8B are illustrative examples of two daily reconcilement reports that may be generated from the report generation technique described above in reference to FIG. 7. Reconcilement reports 800_a_ and 800_b_ are based on the same sample set of transactions performed at a recycler 200 during a single day (May 12, 2009). In FIG. 8A, the reconcilement report 800_a_ groups and summarizes the set of transactions into data components (e.g., subsets) based on point of sale (Register001-RegisterCS2). Safe funds transactions are also grouped together in this example and treated like a separate point of sale location. In other examples, safe funds transactions may be displayed as multiple separate transaction types (e.g., safe funds deposits, safe funds withdrawals, safe funds exchanges, etc.), or may be excluded from the report based on the criteria provided by the user, other user preferences, and/or the configuration of the recycler 200. In FIG. 8B, the same set of transactions is summarized and grouped based on user (Cashier134-ManagerA8). As described above, in these examples, four columns are shown for each group of transactions corresponding to a register/user: the validated recycler activity of the register/user (e.g., all withdrawals, validated deposits and exchanges), rejected notes (e.g., unvalidated bills), coin activity, and a net transaction balance which is the sum of the three previous columns. In FIGS. 8A and 8B, the rejected notes and coin activity column values are always positive numbers, indicating that the recycler 200 in these examples only dispenses validated bills and coins during withdrawals and exchanges. Thus, the only unvalidated currency in these categories is the result of deposits (hence the positive balances in these columns). Furthermore, in FIG. 8A, each of the net transaction balances is positive, and the safe funds net transaction balance is zero. These values may reflect a policy by the recycler 200 and/or store by which all registers are completely emptied every night based on the sales for that day and refilled the following morning (therefore no register should ever show a negative net daily balance). Another store policy in this example may dictate that all withdraws and deposits must be associated with a register, and that only safe fund exchanges may be performed without entering a register number (thus the zero net balance for safe fund transactions).

In accordance with another aspect, reconcilement reports may be used to make determinations regarding crediting deposit accounts associated with the retail establishment of the recycler(s) in the report. As discussed above, currency handling devices (e.g., cash recycler 200) or their associated retail stores/corporate offices may communicate with financial institutions following a set of recycler transactions to allow the store's accounts to be debited/credited based on the transactions even before the physical currency is transported to or from the financial institution. Thus, reconcilement reports, such as the illustrative reports shown in FIGS. 8A and 8B, may be transmitted to the bank 130 periodically (e.g., daily) so that the store's accounts can be updated immediately.

In certain examples, the validated and unvalidated currency data included in the reconcilement report may be handled differently by a financial institution 130 receiving the report in order to debit/credit the store's accounts. For example, although the bank 130 may credit the store's deposit account for net positive validated recycler activity, it may be unwilling to do so for unvalidated transactions. Thus, coin deposits at a recycler 200 that does not accept or validate coins, or unvalidated bills that were manually entered by denomination by a store cashier, might not be eligible for account credit until the currency is physically transported to and validated at the bank 130. However, in some examples, unvalidated currency may be eligible for provisional bank account credit until the bank verification occurs, at which point the provisional credit may become real credit.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements of the other embodiments. Additionally, for example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present invention. The description is thus to be regarded as illustrative instead of restrictive on the present invention.

We claim:

1. A method comprising:

processing at a currency handling device a set of one or more transactions, wherein each transaction is associated with at least one of a user and a point of sale, and wherein the transactions comprise one or more currency deposits;

internally validating one or more units of currency received as part of the one or more currency deposits;

identifying as temporarily unreconcilable one or more different units of currency which are part of the one or more currency deposits;

receiving user input identifying one or more currency amounts corresponding to the temporarily unreconcilable units of currency; and generating and outputting via the currency handling device a reconcilement report comprising data summarizing the set of one or more transactions, said data including at least an amount corresponding to the internally validated units of currency, and at least an amount corresponding to the temporarily unreconcilable units of currency, the reconcilement report further comprising:

a number corresponding to a net transaction balance for the set of transactions;

a number corresponding to a balance of temporarily unreconcilable units of currency for the set of transactions; and a number corresponding to a balance of internally validated units of currency for the set of transactions.

2. The method of claim 1, wherein the set of transactions summarized in the reconcilement report comprises at least one of:

all of the currency transactions processed at the currency handling device over a period of time that are associated with a specific user identified in the report, and all of the currency transactions processed at the currency handling device over a period of time that are associated with a specific point of sale system identified in the report.

3. The method of claim 1, wherein identifying the one or more different units of currency as temporarily unreconcilable comprises:

receiving one or more currency notes via an input slot of the currency handling device;

scanning the one or more currency notes using a scanning unit configured to detect at least one of defective notes, counterfeit notes, currency note denomination, and currency note type; and determining based on the scanning that the one or more currency notes are temporarily unreconcilable by the currency handling device; and outputting the one or more currency notes determined as temporarily unreconcilable.

4. The method of claim 1, wherein identifying the one or more different units of currency as temporarily unreconcilable comprises:

identifying one or more coins as part of a currency deposit transaction; and determining that the currency handling device is not configured to perform at least one of receiving, validating, and storing the identified one or more coins; and determining that the one or more coins are temporarily unreconcilable by the currency handling device.

5. The method of claim 1, further comprising:

after identifying the one or more different units of currency as temporarily unreconcilable, providing a user interface to accept input of an amount corresponding to the value of the temporarily unreconcilable currency, and wherein the reconcilement report includes the input amount.

6. The method of claim 5, further comprising:

transmitting the reconcilement report to a cash recycler service in a data center of a financial institution that has agreed to update a direct deposit account (DDA) balance based on the amount of internally validated currency included in the reconcilement report and has agreed to update a provisional credit account balance based on the amount of temporarily unreconcilable currency included in the reconcilement report.

7. The method of claim 1, further comprising:

after identifying the one or more different units of currency as temporarily unreconcilable, storing the temporarily unreconcilable currency in one or more designated storage units within the currency handling device, wherein the temporarily unreconcilable currency is stored separately from the internally validated currency within the currency handling device.

8. A device comprising:

a processor; and memory storing computer readable instructions that, when executed, cause the device to perform a method comprising:

processing a set of one or more transactions, wherein each transaction is associated with at least one of a user and a point of sale, and wherein the transactions comprise one or more currency deposits;

internally validating one or more units of currency received as part of the one or more currency deposits;

identifying as temporarily unreconcilable one or more different units of currency which are part of the one or more currency deposits;

receiving user input identifying one or more currency amounts corresponding to the temporarily unreconcilable units of currency; and generating and outputting a reconcilement report comprising data summarizing the set of one or more transactions, said data including at least an amount corresponding to the internally validated units of currency, and at least an amount corresponding to the temporarily unreconcilable units of currency, the reconcilement report further comprising:

a number corresponding to a net transaction balance for the set of transactions;

a number corresponding to a balance of temporarily unreconcilable units of currency for the set of transactions; and a number corresponding to a balance of internally validated units of currency for the set of transactions.

9. The device of claim 8, wherein the set of transactions summarized in the reconcilement report comprises at least one of:

all of the currency transactions processed at the device over a period of time that are associated with a specific user identified in the report, and all of the currency transactions processed at the device over a period of time that are associated with a specific point of sale system identified in the report.

10. The device of claim 8, wherein identifying the one or more different units of currency as temporarily unreconcilable comprises:

receiving one or more currency notes via an input slot of the device;

scanning the one or more currency notes using a scanning unit configured to detect at least one of defective notes, counterfeit notes, currency note denomination, and currency note type; and determining based on the scanning that the one or more currency notes are temporarily unreconcilable by the device; and outputting the one or more currency notes determined as temporarily unreconcilable.

11. The device of claim 8, wherein identifying the one or more different units of currency as temporarily unreconcilable comprises:

identifying one or more coins as part of a currency deposit transaction; and determining that the device is not configured to perform at least one of receiving, validating, and storing the identified one or more coins; and determining that the one or more coins are temporarily unreconcilable by the device.

12. The device of claim 8, further comprising:

after identifying the one or more different units of currency as temporarily unreconcilable, providing a user interface to accept input of an amount corresponding to the value of the temporarily unreconcilable currency, and wherein the reconcilement report includes the input amount.

13. The device of claim 12, further comprising:

transmitting the reconcilement report to a cash recycler service in a data center of a financial institution that has agreed to update a direct deposit account (DDA) balance based on the amount of internally validated currency included in the reconcilement report and has agreed to update a provisional credit account balance based on the amount of temporarily unreconcilable currency included in the reconcilement report.

14. The device of claim 8, further comprising:

after identifying the one or more different units of currency as temporarily unreconcilable, storing the temporarily unreconcilable currency in one or more designated storage units within the device, wherein the temporarily unreconcilable currency is stored separately from the internally validated currency within the device.

15. A method comprising:

receiving at a financial institution a reconcilement report corresponding to one or more transactions processed at a currency handling device associated with a retail location, wherein the reconcilement report comprises data including at least a first value corresponding to an amount of validated currency received by the currency handling device and a second value corresponding to an amount of unvalidated currency identified as part of the one or more transactions;

identifying one or more financial accounts at the financial institution associated with the retail location;

crediting a first account with real credit based on the first value corresponding to the amount of validated currency received by the currency handling device; and crediting a second account with provisional credit based on the second value corresponding to the amount of unvalidated currency identified as part of the one or more transactions.

16. The method of claim 15, wherein the first account and the second account correspond to the same account at the financial institution.

17. The method of claim 15, wherein the reconcilement report summarizes a set of transactions processed by the currency handling device at the associated retail location over a specific period of time identified in the report.

18. The method of claim 15, wherein the second value corresponds to a sum of one or more notes of currency identified as temporarily unreconcilable by the currency handling device, and a sum of one or more coins unsupported by the currency handling device.

19. The method of claim 15, further comprising:

transmitting a confirmation message indicating that the first account has been credited with real credit and the second account has been credited with provisional credit based on the received reconcilement report, wherein the confirmation message is transmitting to at least one of the currency handling device and a corporate office associated with the retail location.

20. The method of claim 15, wherein the reconcilement report received at the financial institution summarizes a set of transactions processed at the currency handling device, the reconcilement report comprising:

a number corresponding to a net transaction balance for the set of transactions;

a number corresponding to a balance of unvalidated units of currency for the set of transactions; and a number corresponding to a balance of validated units of currency for the set of transactions.

21. The method of claim 15, wherein the first account and the second account correspond to different accounts at the financial institution.

22. An apparatus comprising:

a processor; and memory storing computer readable instructions that, when executed, cause the apparatus to perform a method comprising:

receiving at a reconcilement report corresponding to one or more transactions processed at a currency handling device associated with a retail location, wherein the reconcilement report comprises data including at least a first value corresponding to an amount of validated currency received by the currency handling device and a second value corresponding to an amount of unvalidated currency identified as part of the one or more transactions;

identifying one or more financial accounts associated with the retail location;

crediting a first account with real credit based on the first value corresponding to the amount of validated currency received by the currency handling device; and crediting a second account with provisional credit based on the second value corresponding to the amount of unvalidated currency identified as part of the one or more transactions.

23. The apparatus of claim 22, wherein the reconcilement report summarizes a set of transactions processed by the currency handling device at the associated retail location over a specific period of time identified in the report.

24. The apparatus of claim 22, wherein the second value corresponds to a sum of one or more notes of currency identified as temporarily unreconcilable by the currency handling device, and a sum of one or more coins unsupported by the currency handling device.

25. The apparatus of claim 22, further comprising:

transmitting a confirmation message indicating that the first account has been credited with real credit and the second account has been credited with provisional credit based on the received reconcilement report, wherein the confirmation message is transmitting to at least one of the currency handling device and a corporate office associated with the retail location.

26. The apparatus of claim 22, wherein the received reconcilement report summarizes a set of transactions processed at the currency handling device, the reconcilement report comprising:

a number corresponding to a net transaction balance for the set of transactions;

a number corresponding to a balance of unvalidated units of currency for the set of transactions; and a number corresponding to a balance of validated units of currency for the set of transactions.

27. The apparatus of claim 22, wherein the first account and the second account correspond to different accounts at the financial institution.

* * * * *